Patented Dec. 8, 1925.

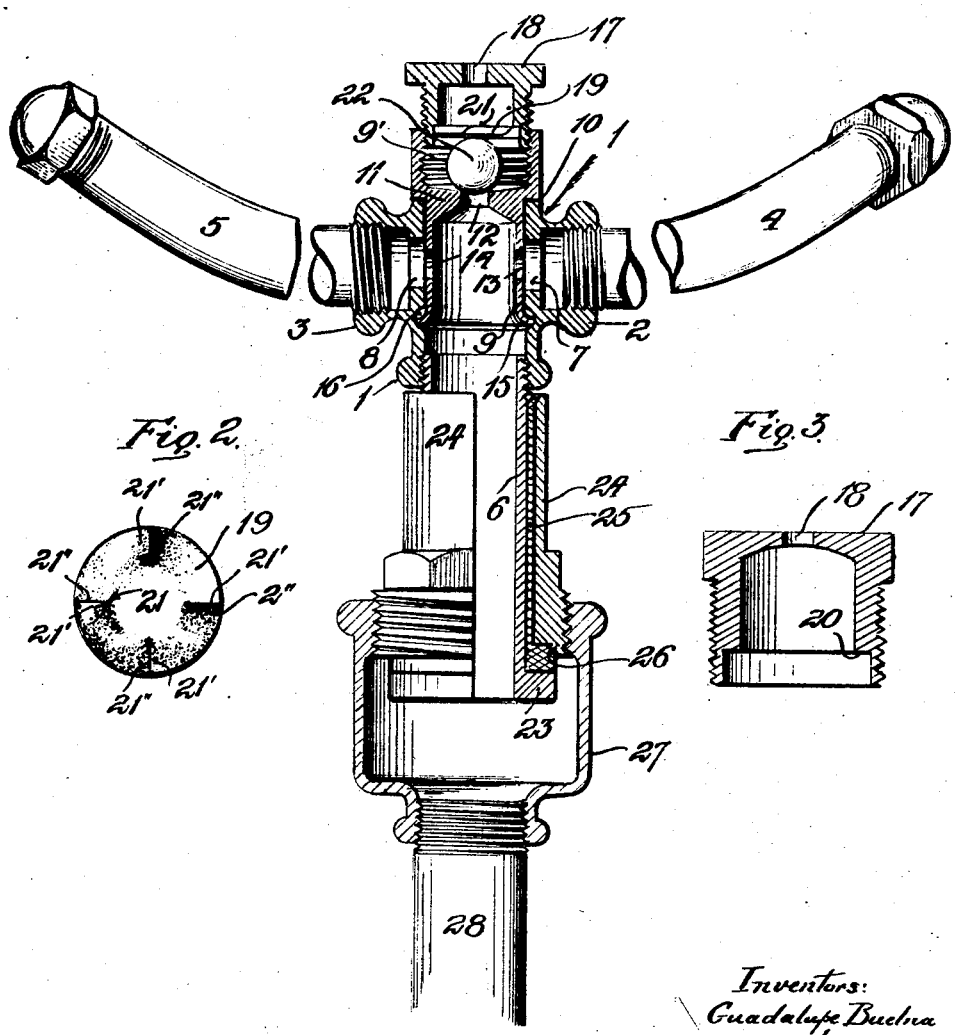

1,564,934

UNITED STATES PATENT OFFICE.

GUADALUPE BUELNA AND HENRI EUGENE JEREMIE VACHER, OF SANTA BARBARA, CALIFORNIA; SAID BUELNA ASSIGNOR TO SAID VACHER.

SPRINKLER.

Application filed October 29, 1923. Serial No. 671,339.

*To all whom it may concern:*

Be it known that we, GUADALUPE BUELNA, a citizen of the United States, and HENRI EUGENE JEREMIE VACHER, a citizen of Canada, residing at Santa Barbara, county of Santa Barbara, and State of California, have invented a certain new and useful Sprinkler, of which the following is a specification.

Our invention relates to a device for distributing water and it has especial reference to a water sprinkler head of the type arranged for rotary motion which may be maintained by the water passing through same, the object of the invention being to provide a sprinkler head by which large quantities of water may be thrown and in which the quantity of water discharged from the sprinkler head may be controlled at all times.

Another object of the invention is to provide a sprinkling arrangement from which a plurality of streams of water may be projected and which may be so adjusted that both the number of streams of water discharging from the head and also the capacity of the streams may be regulated as needed or desired whereby irrigation of areas may be made as required by the condition of the soil or earth.

Another object of the invention is to simplify the construction of a sprinkler head, provide a rotating sprinkler in which friction is reduced to a minimum and assembly and dissociation of the parts made possible by anyone.

Other objects will appear from the following specification, in connection with the accompanying drawing, which is illustrative of a form of embodiment of the invention and in which—

Fig. 1 is a vertical sectional elevation showing our invention.

Fig. 2 is a plan view of a water distributing or water whirling member, and

Fig. 3 is a sectional view of a housing nut for containing the water whirling means.

Referring to the drawing, the invention is shown as consisting of a T-fitting 1, the lateral branches 2 and 3, of which are internally threaded to receive the oppositely directed sprinkling arms 4 and 5 and the vertical branch of which is internally threaded for connection with a section of pipe 6, hereinafter more especially referred to. Each branch 2 and 3 respectively of the T-fitting is provided with a lateral outlet opening 7 and 8, diametrically smaller than the internal diameter of the branches. Associated with said T-fitting 1, for axial movement relative thereto, is a hollow tubular body 9, constituting substantially a valve, and formed with a shoulder 10, providing a bearing for said tubular member or valve 9 upon the top of the T-fitting 1. This hollow member or valve 9 is formed with a transverse wall 11, having a constricted central passageway 12, extended vertically through same and communicating with a valve housing 9' in said tubular valve member 9 above said transverse wall 11 and with the space below said wall and arranged in line with the flow of water. The reduced portion of said valve is provided with opposed lateral ports 13 and 14, which are arranged to be brought into register with the lateral outlet ports or openings 7 and 8 respectively in the branches 2 and 3 respectively of the T-fitting 1. The bottom of the tubular member 9 is flared or expanded to lock same in secure association with said T-fitting and such flared or expanded portion 15 is extended into an annular groove 16 within said T-fitting 1 whereby the valve 9 may be rotated and at the same time prevented from being withdrawn. The portion of said tubular member or body 9, that extends beyond the upper end of the fitting is exteriorly formed for the accommodation of a wrench or other member in rotating same for adjustment, that is, for establishing communication between the lateral branches 2 and 3 respectively and controlling the water supply pipe 6 through the tubular member or valve 9, or shutting of the supply of water to said branches 2 and 3 respectively. The upper portion of the valve 9 is threaded internally for receiving a threaded sprinkling nozzle 17, which is provided with a water outlet 18 through which the water escapes after being given a whirling motion by a deflecting means 19, which is forced into said sprinkling nozzle 17 against an annular shoulder 20, Fig. 3. This deflecting means 19 may be of any construction suited to the purposes, and for this disclosure may consist of an annular disk of metal, as shown in Fig. 2, having a plurality of incisions 21 extending inwardly from the periphery of the disk and the metal between each incision being twisted or bent so that the edges 21' and 21" extend to opposite sides of the plane of the metal body or disk 19, whereby four distinct inclined surfaces are provided. The water, entering through the passageway 12, impinges against the metal deflecting means 19 and is given a whirling motion as it enters into and escapes from the sprinkler nozzle 17. In this manner a dispersion of the water is effected over a large area, the quantity of water passing through same being regulable by a ball valve 22 within the space between the ported wall 11, and the metal disk or deflecting means 19, which by movement of the sprinkler nozzle 17 within the upper part of the valve 9, may be caused to permit the unseating of said ball valve 22 preferably of compressible material, as rubber, to greater or lesser extents or hold said ball valve 9, seated to prevent entirely the egress of any water. By manipulation of the valve 9 relatively to the T-fitting 1 the sprinkler arms 4 and 5 and the sprinkler nozzle 17 three definite streams of water may be thrown from the sprinkler head, and the quantity of each stream may be regulated as needed; the water passing through the nozzle 17 may be shut off while the water is escaping from the sprinkler arms 4 and 5; the water may be entirely shut off from the sprinkler arms 4 and 5 while the water is passing through the nozzle 17; finally, by manipulation of the valve 9 and the nozzle 17, no water may pass through the sprinkler.

The vertical branch of the T-fitting 1 is connected to a section of pipe 6, as previously stated, and this pipe section 6 is provided with an annular extension 23 forming a bearing surface for the pipe section 6, when it is revolved with the sprinkler head. This pipe section 6 is extended through an externally threaded sleeve 24, between which and the pipe section 6 is a lining of anti-friction material 25, as Babbitt metal, which fills an annular groove 26 in and extends beyond the said sleeve, as shown, and provides a bearing surface for the pipe section 6 during the revolution thereof.

A reducer 27 threadedly engages the sleeve 24 and is connected with a source of water supply 28 for the sprinkler.

What we claim, is:

1. A sprinkler comprising a water distributing head, a water supply stand pipe, a means for associating said distributing head with said stand pipe to have rotatory movement relative to said stand pipe, said distributing head having lateral branches and reduced passageways communicating with said branches, sprinkler arms adjustably carried in said branches and disposed with respect thereto to effect rotation of said sprinkler head, a tubular valve member within and connected with said sprinkler head said valve member movable with and independently of said head to control the supply of water to said sprinkler arms said tubular valve member formed with a vertical passageway and a valve housing, a valve within said housing and a water nozzle adjustable in said housing to control the supply of water to said nozzle.

2. A sprinkler comprising a water distributing head rotatably associated with a suitable water supply and formed with laterally extended branches for sprinkler arms, a valve member within and movable relatively to and with said distributing head to control the supply of water to said sprinkler arms, said valve member formed with a valve housing and a port connecting with said valve housing, a valve within the housing of said valve member, and a vertical water stream directing nozzle adjustable in said housing to operate said valve and thereby control the passage of water through the port in said housing.

3. A sprinkler comprising a water distributing head rotatably associated with a suitable water stand pipe and formed with laterally extended branches for sprinkler arms, a ported valve member within said distributing head and associated with said head to have relative rotatable movement to control the water supply to said sprinkler arms, said valve member formed with a valve housing and a vertical water passageway communicating with said housing, a compressible valve within said housing operable by the water to unseat same, and a vertical stream directing nozzle adjustable in said housing to operate said compressible valve and control the flow of water through said vertical passageway.

4. A sprinkler comprising a water distributing head rotatably associated with a water supply pipe and formed with laterally extended branches for sprinkler arms, an open ended tubular valve member connected with said distributing head and provided with lateral ports for directing the water to said branches and sprinkler arms, said tubular valve member movable relatively to said distributing head and formed with a transverse wall having a vertical passageway and a valve housing a compressible valve in said housing, and a nozzle adjustable in said housing to operate said valve in controlling the flow of water through the passageway in said wall.

5. A sprinkler comprising a water distributing head rotatably associated with a water supply pipe and formed with lateral exits for water, a tubular valve member within and rotatable with said head and axially movable independently of said head to control the flow of water through said exits, said valve member formed with a vertical passageway and a valve housing, a valve in the housing of said tubular valve and a water directing nozzle adjustable in said housing to operate said valve and thereby control the passage of water through said vertical passageway.

6. A sprinkler comprising a water distributing head rotatably associated with a water supply pipe and having lateral water outlets, a valve member within and rotatable with and independently of said distributing head to control the flow of the water through said water outlets, said valve member formed with a vertical passageway, a nozzle in said valve member for directing upwardly a stream of water and means controllable by said nozzle for regulating the flow of water to said nozzle.

In testimony whereof we have set our hands.

GUADALUPE BUELNA.
HENRI EUGENE JEREMIE VACHER.